United States Patent
Baina et al.

(10) Patent No.: US 9,632,192 B2
(45) Date of Patent: Apr. 25, 2017

(54) METHOD OF PROCESSING SEISMIC DATA BY PROVIDING SURFACE OFFSET COMMON IMAGE GATHERS

(75) Inventors: Reda Baina, Pau (FR); Laurence Nicoletis, Pau (FR); Matteo Giboli, Pau (FR)

(73) Assignee: TOTAL SA, Courbevoie (FR)

( * ) Notice: Subject to any disclaimer, the term of this patent is extended or adjusted under 35 U.S.C. 154(b) by 530 days.

(21) Appl. No.: 14/119,664

(22) PCT Filed: May 23, 2011

(86) PCT No.: PCT/IB2011/001585
§ 371 (c)(1),
(2), (4) Date: Nov. 22, 2013

(87) PCT Pub. No.: WO2012/160409
PCT Pub. Date: Nov. 29, 2012

(65) Prior Publication Data
US 2014/0149046 A1    May 29, 2014

(51) Int. Cl.
*G01V 1/28*     (2006.01)

(52) U.S. Cl.
CPC ............ *G01V 1/28* (2013.01); *G01V 1/282* (2013.01); *G01V 2210/512* (2013.01)

(58) Field of Classification Search
CPC .......... G01V 1/28; G01V 1/282; G01V 1/286; G01V 1/42; G01V 1/301; G01V 1/40;
(Continued)

(56) References Cited

U.S. PATENT DOCUMENTS

| 4,980,866 A | * | 12/1990 | Wang | G01V 1/362 367/50 |
| 5,157,638 A | * | 10/1992 | Loumos | G01V 1/362 367/50 |

(Continued)

FOREIGN PATENT DOCUMENTS

GB    2 432 936 A    6/2007

OTHER PUBLICATIONS

Adler F et al: "Nonlinear 3d tomographic least-squares inversion of residual moveout in Kirchhoff prestack-depth-migration common-image gathers", Geophysics, Society of Exploration Geophysicists, US, vol. 73, No. 5, sup, Sep. 1, 2008 (Sep. 1, 2008), pp. VE13-VE23, XP001516153, ISSN: 0016-8033, DOI: 10.1190/1.2956427 p. VE15-p. VE19.

(Continued)

*Primary Examiner* — Manuel L Barbee
(74) *Attorney, Agent, or Firm* — Patterson Thuente Pedersen, P.A.

(57) ABSTRACT

The method processes input including, for each of a plurality of shots at respective source locations, seismic traces recorded at a plurality of receiver locations. Offset-modulated data are also computed by multiplying the seismic data in each seismic trace by a horizontal offset between the source and receiver locations for said seismic trace. A depth migration process is applied to the seismic data to obtain a first set of migrated data, and to the offset-modulated data to obtain a second set of migrated data. For each shot, offset values are estimated and associated with respective subsurface positions, by a division process applied to the first and second sets of migrated data.

12 Claims, 6 Drawing Sheets

(58) Field of Classification Search
CPC . G01V 1/30; G01V 1/284; G01V 1/44; G01V 1/46; G01V 1/48; G01V 1/50; G01V 2210/512; G01V 2210/161; G01V 2210/50; G01V 2210/51; G01V 2210/16
See application file for complete search history.

(56) References Cited

U.S. PATENT DOCUMENTS

| | | |
|---|---|---|
| 6,002,642 A | 12/1999 | Krebs |
| 6,731,568 B1 | 5/2004 | Audebert |

OTHER PUBLICATIONS

Tech Link, "Reverse Time Migration", a Publication of Petroleum Geo-Services, vol. 7, No. 1, Sep. 2007, www.pgs.com/upload/188525/techlink40_rtm_sm.pdf.

Rickett and Sava, "Offset and angle-domain common image-point gathers for shot-profile migration", Geophysics, vol. 67, No. 3 (May-Jun. 2002), p. 883-889, 8 Figs., 10.1190/1.1484531.

Sava and Fomel, "Time-shift imaging condition in seismic migration", Geophysics, vol. 71, No. 6 (Nov.-Dec. 2006), p. S209-S217, 16 Figs, 10.1190/1.2338824.

Sava and Fomel, "Angle-domain common-image gathers by wavefield continuation methods", Geophysics, vol. 68, No. 3 (May-Jun. 2003), p. 1065-1074, 14 Figs, 10.1190/1.1581078.

Bleistein, "On the imaging of reflectors in the earth", Geophysics, vol. 52, No. 7 (Jul. 1987) ; p. 931-942, 1 Fig.

\* cited by examiner

Standard data

Modulated data

METHOD OF PROCESSING SEISMIC DATA BY PROVIDING SURFACE OFFSET COMMON IMAGE GATHERS

PRIORITY CLAIM

The present application is a National Phase entry of PCT Application No. PCT/IB2011/001585, filed May 23, 2011, said application being hereby incorporated by reference herein in its entirety.

FIELD OF THE INVENTION

The present invention relates to methods of processing seismic data. It is applicable in the field of geophysical prospecting when images of the subsurface are needed.

BACKGROUND OF THE INVENTION

To obtain images of the subsurface, a seismic method is often used, which consists in creating and sending seismic waves in the ground using sources such as explosives or vibrator trucks on land, or airguns offshore. The seismic waves penetrate the ground and get bounced, or reflected off geological discontinuities in the subsurface. As a result, they come back to the surface, where they are recorded using arrays of three component geophones (on land), or hydrophones (offshore) which are regularly distributed to cover areas of several square kilometers.

FIG. 1 illustrates diagrammatically a survey of seismic data with a source S of seismic waves and an array of receivers G. It also shows a point B of the subsurface which is assumed to contribute to the signal sensed by one of the receivers G. The horizontal coordinates of point B of the subsurface are denoted by x, y (or only one spatial coordinate if 2D imaging instead of 3D imaging is considered), while its depth is denoted by z. FIG. 1 also provides a simplified representation (dashed lines) of the propagation of seismic waves from the source S to the point B and from the point B to the receiver G. The waves are refracted at discontinuities of the geological layers where the acoustic impedance changes and reflected or diffracted at different positions including that of point B.

The data recorded in a seismic survey include, for each shot from a source S and for each receiver G, a seismic trace which is a time series of the signal sensed by the receiver G. The traces for a number of shots must be transformed to provide an image of the subsurface which will be the result of stacking or integrating a large amount of information. An important step of the transformation is the migration which consists in rearranging the data with respect to a model such that the stacking can be carried out coherently. The model is usually a map of the propagation velocity of the acoustic waves in the subsurface. It is not known a priori and it is a main challenge of all seismic imaging technologies to determine a model that will properly account for the field data after stacking.

In pre-stack depth migration (PSDM) methods, migrated data are computed for each shot using the velocity model and arranged in an output cube containing migrated values associated with positions in the subsurface. The cubes obtained for different shots are then analyzed to check consistency of the model. The model may be corrected and the process is iterated until a satisfactory image is obtained.

Common Image Gathers (CIGs) are popular tools for evaluating the migration velocity field and for imaging enhancement. They are made of data extracted from the output cubes, sorted in a convenient way for analysis so as to check the velocity model. A CIG is a bi-dimensional data structure defined for a given horizontal position x, y, with a first axis representing the depth z and a second axis representing a domain parameter A referred to for sorting the data of the output cubes. It contains reflectivity values obtained from the output cubes resulting from the migration, forming an image which can be analyzed to check and/or correct the velocity model. In this image, a pixel value at a point (z, A) represents a migrated value derived as a contribution of the subsurface position x, y, z to a seismic trace associated with the domain parameter A. Examples of commonly used domain parameters A include the surface offset, namely the distance between the source location for a shot and the receiver location providing the relevant trace for that shot, or the scattering angle at the subsurface position x, y, z.

The computation of common image gathers is not straightforward in all wavefield extrapolation methods. In fact, to date, depending on the propagation method employed to perform the migration, the output cubes are sorted in different ways. Even if there is no theoretical reason for this, the most practical way to produce common image gathers is selected according to different types of migration.

For example, scattering angle CIGs or surface offset CIGs are of widespread use in ray-based tomography techniques, to look for the velocity model which gives 'flat gathers'. FIGS. 2A-C illustrate the principle in the case of surface offset CIGs. We consider a flat reflector at a position $x_0$, $y_0$, $z_0$ of the subsurface. If the velocity model is correctly estimated, the reflector will provide a peak in the migrated signal at depth $z_0$ for all values of the offset h, thus giving a flat event in the CIG as shown in FIG. 2A. If, however, the migration velocity is overestimated in the model, the same peak observed at the same time in a seismic trace will be associated with a larger depth value $z_1$ as shown in FIG. 2B, and the corresponding event in the CIG will have a concave shape since the discrepancy in the wave travel time increases with the offset h. Likewise, if the migration velocity is underestimated in the model, the peak will be associated with a shallower value $z_2$ as shown in FIG. 2C, and the corresponding event in the CIG will have a convex shape. If the reflector has a non-zero dip angle, its image in the CIG will be shifted horizontally in addition to vertically. Different tools have been developed to analyze the surface offset CIGs in order to correct the velocity model.

However, such tools have been used mostly in migration methods based on estimation of travel times between reflectors and the surface. More sophisticated migration methods have been developed to build PSDM images by solving the wave equation so as to obtain more accurate reflector amplitudes and structural positioning. For example, reverse-time migration (RTM) is a two-way migration solution which can accurately describe wave propagation in complex media. It is increasingly used in seismic exploration by virtue of advances in computer power and programming.

The above-mentioned analysis tools are not used with wave equation PSDM methods, including RTM, because it is not known how to compute surface offset CIGs.

In "Offset and angle-domain common image-point gathers for shot-profile migration", Geophysics, Vol. 67, No. 3, 2002, pp. 883-889, J. Rickett and P. Sava established the notion of subsurface offset CIGs which requires the extension of the imaging condition through the computation of the correlation function along the spatial horizontal dimension. This type of gathers is the most common way to output wavefield-based migration images. It is better suited to techniques based on focusing analysis, which look for the highest correlation at zero-time lag and/or zero-offset. In "Angle-domain common image gathers by wavefield continuation methods", Geophysics, Vol. 68, No. 3, 2003, pp. 1065-1074, P. Sava and S. Fomel proposed a method to derive scattering angle CIGs from subsurface offset CIGs. More recently, the same authors, by combining both time and depth, introduced the concept of extended image condition in "Time-shift imaging condition in seismic migration", Geophysics, Vol. 71, No. 6, pp. 209-217.

Despite their benefits, some issues prevent the generalized usage of subsurface offset and angle gathers. Firstly, since RTM is a computer-intensive process, the computation of the cross-correlations for all the selected CIG locations adds a considerable extra cost. Secondly, subsurface offset gathers cannot be employed for classical tomography. The analysts cannot benefit from the full arsenal of tools developed for classical surface or angle CIGs (like RMO, Mute, AVO/AVA analysis, etc.). Subsurface scattering angle CIGs would be suited for this goal. However, these gathers imply an additional cost for a two-parameter Radon transform, and they do not show the correct kinematic move-out.

It would be desirable to obtain surface offset gathers with different kinds of migration methods, in particular wavefield methods including RTM, so as to keep the advantages of wavefield methods and, at the same time, address the limitation of the asymptotic assumption of ray-based methods, while sorting the migrated cubes in the same way as classical surface offset gathers.

SUMMARY OF THE INVENTION

A method of processing seismic data is proposed to provide common image gathers in the surface offset domain. The method comprises:
  inputting seismic data including, for each of a plurality of shots at respective source locations, seismic traces recorded at a plurality of receiver locations;
  applying a depth migration process to the seismic data to obtain a first set of migrated data including, for each shot, first migrated values respectively associated with a plurality of subsurface positions;
  computing offset-modulated data by multiplying the seismic data in each seismic trace by a horizontal offset between the source and receiver locations for said seismic trace;
  applying the depth migration process to the offset-modulated data to obtain a second set of migrated data including, for each shot, second migrated values respectively associated with the plurality of subsurface positions;
  for each shot, estimating offset values respectively associated with at least some of the subsurface positions, by a division process applied to the first and second sets of migrated data; and
  estimating a common image gather at a horizontal position, comprising respective migrated values for parameter pairs each including a depth parameter and an offset parameter.

The migrated value for a parameter pair in the common image gather at a horizontal position is a first migrated value of the first set of migrated data associated with a subsurface position determined by said horizontal position and the depth parameter of said parameter pair for a shot such that the estimated offset value associated with said subsurface position is the offset parameter of said parameter pair.

The surface offset gathers can be obtained without referring to the traditional Kirchhoff paradigm which is based on an infinite frequency approximation of the wave equation and ray tracing. The method is thus applicable to various kinds of depth migration processes, including wave equation pre-stack depth migration (WEPSDM) processes. In a preferred embodiment, the depth migration process is a reverse-time migration (RTM) process.

RTM provides a better propagator than ray tracing. Therefore, it allows producing CIGs in complex areas like subsalt, complex overburden, etc., somewhat closer to the "true" offset gathers. Furthermore, since the sorting of the output is the same, the conventional Kirchhoff offset gathers can be replaced by the CIGs obtained by means of the method as input of most of the standard post-processing tools. Because of years of know-how in Kirchhoff-type migration, this method allows for an easier interpretation of the migrated results. Compared to subsurface CIGs, it also requires much less computational effort to compute the gathers. Furthermore, these gathers are potentially suited for wave-path tomography.

For achieving an improved stability, the division process used for estimating the offset values associated with a subsurface position may comprise minimizing a cost function defined by an offset variable and local values of the first and second migrated values in a neighborhood of the subsurface position.

Another aspect of the invention relates to a system for processing seismic data, comprising computer resource configured to carry out a method of analyzing seismic data as defined above.

Yet another aspect of the invention relates to a computer program product for a system for processing seismic data, comprising instructions to carry out a method as defined above when said program product is run in a computer processing unit of the system.

Other features and advantages of the method and apparatus disclosed herein will become apparent from the following description of non-limiting embodiments, with reference to the appended drawings.

BRIEF DESCRIPTION THE DRAWINGS

FIG. 1 is a schematic diagram illustrating the acquisition of seismic data.

FIGS. 2A-C show simplified CIGs computed using different migration velocity values.

DESCRIPTION OF EMBODIMENTS

One way to obtain surface offset CIGs for WEPSDM or RTM migration methods would be to compute one migration per shot and per trace, requiring a number of migrations equal to the total number of shots times the average number of receivers per shot. This is clearly impractical for the time being, especially for 3D cases. Instead, it is proposed to use a more feasible solution, namely attribute migration, also called double migration.

In the double migration method as introduced by N. Bleistein ("On the imaging of reflectors in the earth", Geophysics, Vol. 52, No. 7, July 1987, pp. 931-942), two migrations are computed with the same data, the second one involving a migration operator multiplied by the specular reflection angle. The division of the two migrated images then gives the specular angle along the reflectors.

A similar method can be used with the surface offset instead of the specular reflection angle as the migrated attribute. The migration can be performed using various PSDM methods including standard shot-record RTM.

Figure 1:
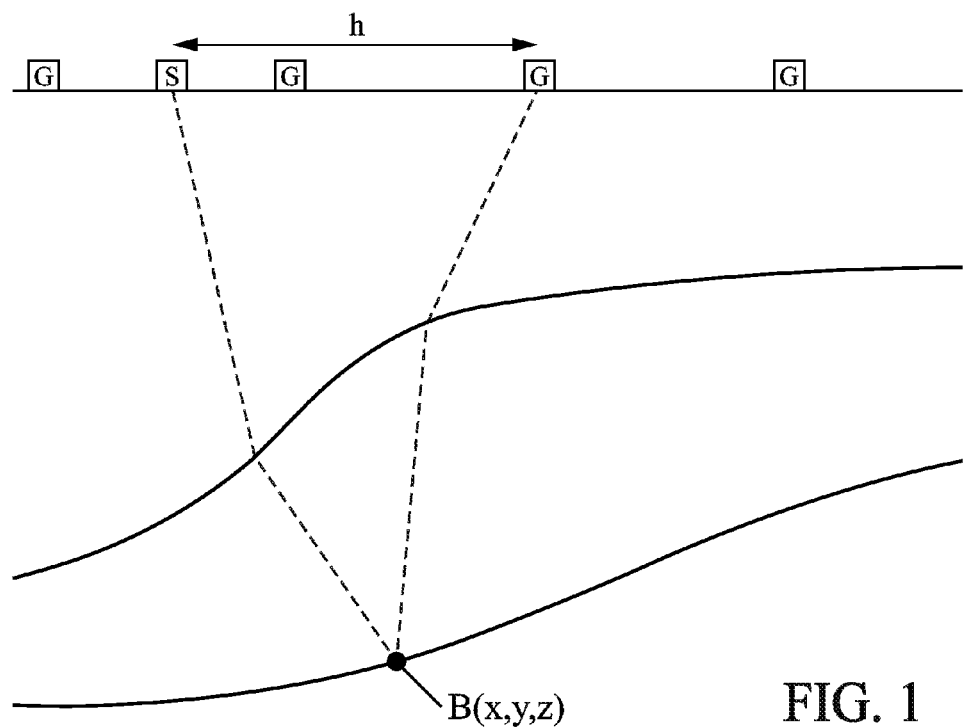
Figure 2A:
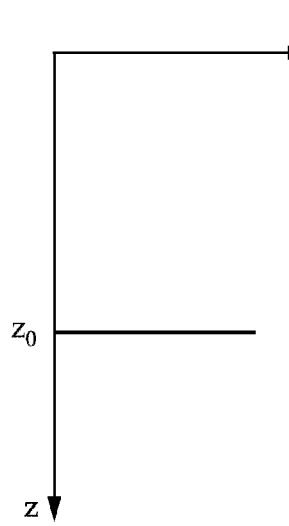
Figure 2B:
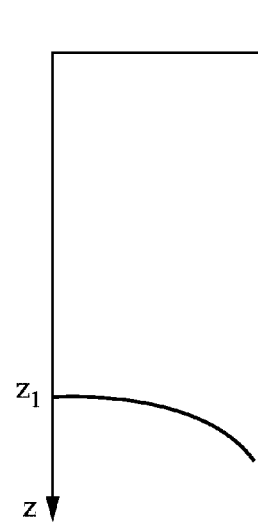
Figure 2C:
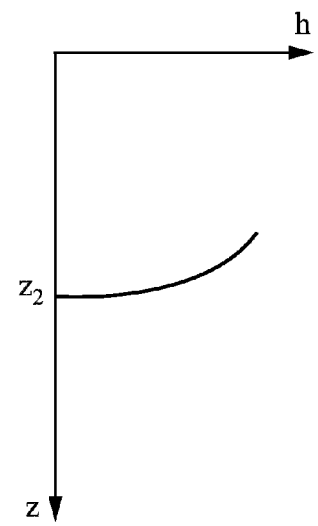
Figure 3:
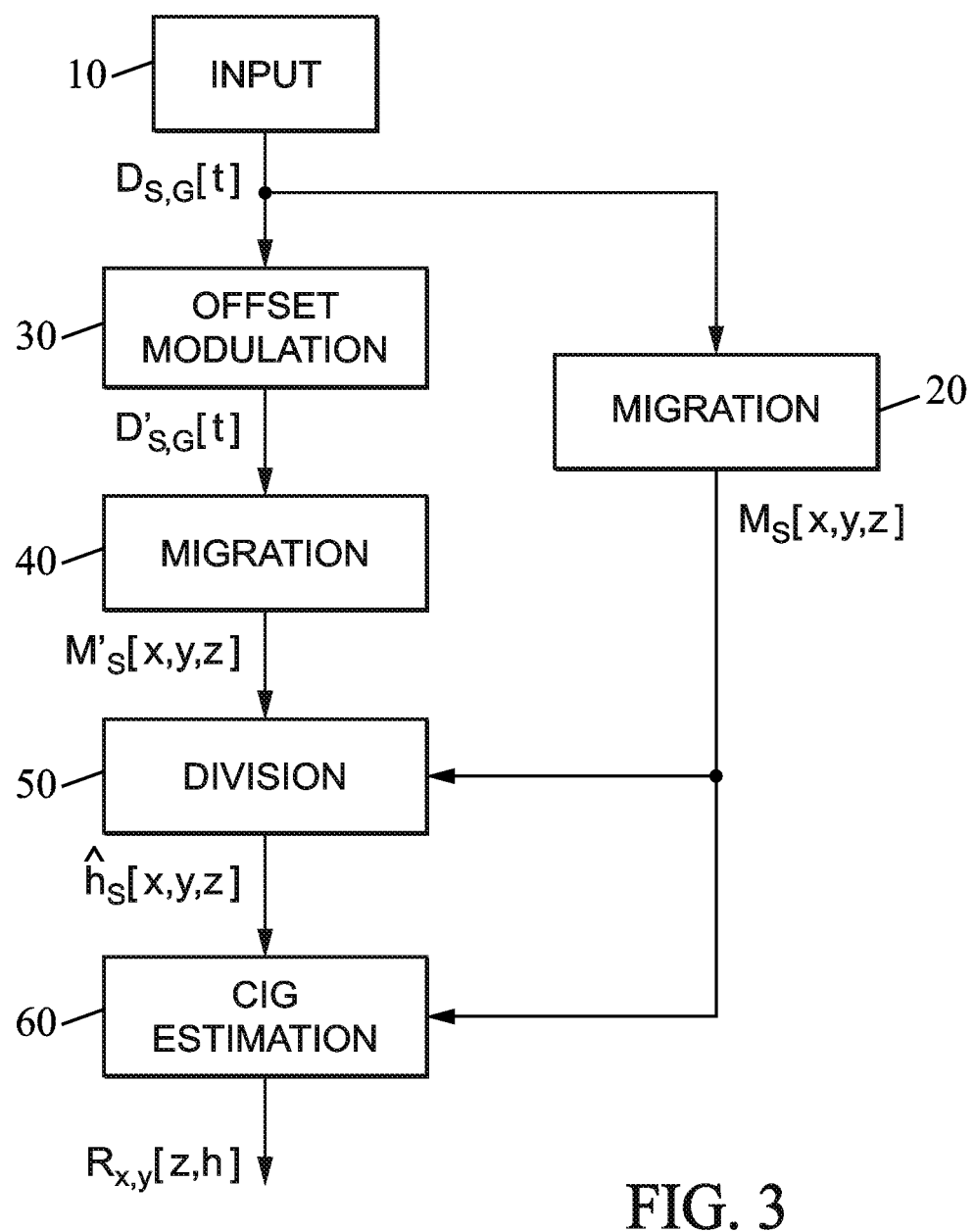
FIG. 3 is a flowchart of a method of processing seismic data in accordance with an embodiment of the invention.

The methodology then comprises:
performing a first standard RTM migration (step 20 in FIG. 3);
performing a second offset attribute RTM migration, where the data are multiplied by the offset values prior to migration (steps 30 and 40 in FIG. 3);
perform a division of the two migrated data obtained, in a least square sense, to obtain the offset (step 50 in FIG. 3); and
add the reflectivity obtained from the first migrated data to the corresponding subsurface and offset gather location given by the obtained attribute map to reconstruct surface offset CIGs (step 60 in FIG. 3).

In this way we are able to obtain classical surface offset CIGs using a WEPDSM migration method such as RTM which is an extrapolation method available for seismic migration.

In FIG. 3, the seismic traces input in step 10 from the field measurements are noted $D_{S,G}[t]$, where S denotes a source location, G denotes a receiver location and t is for time. Each trace is modulated in step 30 by multiplying it by the corresponding offset value, namely the horizontal offset $h_{S,G}$ between the source location S and the receiver location G. The offset-modulated traces are $D'_{S,G}[t] = h_{S,G} \cdot D_{S,G}[t]$.

The seismic data $D_{S,G}[t]$ and offset-modulated data $D'_{S,G}[t]$ are respectively migrated in steps 20 and 40 to provide PSDM data $M_S[x,y,z]$ and $M'_S[x,y,z]$. The first set of migrated data produced in step 20 includes, for each shot at a source location S, a cube of migrated values $M_S[x,y,z]$ associated with subsurface positions x, y, z. Likewise, the second set of migrated data obtained in step 40 using the same depth migration process includes another cube of migrated values $M'_S[x,y,z]$ for each shot.

In order to estimate an offset value $\hat{h}_S[x, y, z]$ for a migrated value $M_S[x,y,z]$, i.e. a value for a shot S and a subsurface position x, y, z, a division process is performed in step 50 to evaluate $M'_S[x,y,z]/M_S[x,y,z]$.

A raw division of the two numbers may give rise to stability issues. Instead, it may be better to cast the division as a set of local least square problems. The offset value $\hat{h}_S[x,y,z]$ is then found by minimizing a cost function $J_{S,x,y,z}(h)$ defined in a neighborhood $\Omega(x,y,z)$ centered on the location x, y, z. A possible expression of the cost function $J_{S,x,y,z}(h)$ is:

$$J_{S,x,y,z}(h) = \frac{1}{2} \int_{(u,v,w)\in\Omega(x,y,z)} |M_S^a[u, v, w] \cdot h - M_S'^a[u, v, w]|^2 du \cdot dv \cdot dw \quad (1)$$

where $M_S^a[x,y,z] = M_S[x,y,z] + i \cdot H(M_S[x,y,z])$ is the analytic signal of the reflectivity, H denoting the Hilbert transform, and $M_S'^a[x,y,z] = M'_S[x,y,z] + i \cdot H(M'_S[x,y,z])$. The size of the neighborhood $\Omega(x,y,z)$ is variable and can depend on the application. It is selected such that the value of the migrated attribute h can reasonably be assumed to be constant over $\Omega(x,y,z)$ for a given shot.

The offset values $\hat{h}_S[x,y,z]$ may then be contained as:

$$\hat{h}_S[x, y, z] = \underset{h}{\mathrm{Argmin}}(J_{S,x,y,z}(h)) = \frac{\int_{\Omega(x,y,z)} M_S'^a[u, v, w] \cdot (M_S^a[u, v, w])^* du \cdot dv \cdot dw}{\int_{\Omega(x,y,z)} M_S^a[u, v, w] \cdot (M_S^a[u, v, w])^* du \cdot dv \cdot dw} \quad (2)$$

where the superscript (.)* denotes the Hermitian. Note that the upper part of the right-hand side of equation (2) is the cross-correlation of the two images, the standard migrated image and the attribute-migrated image. The lower part is the auto-correlation of the standard migrated image, or the envelope. In this way, the stability of the division is increased.

The offset values $\hat{h}_S[x,y,z]$ thus obtained are used to map the reflectivity values $M_S[x,y,z]$ to corresponding offsets h, which reflectivity values can then arranged as surface offset CIGs at the horizontal positions x, y:

$$R_{x,y}[z, h] = \int_S M_S[x, y, z] \cdot \delta(h - \hat{h}_S[x, y, z]) \quad (3)$$

Figure 4:
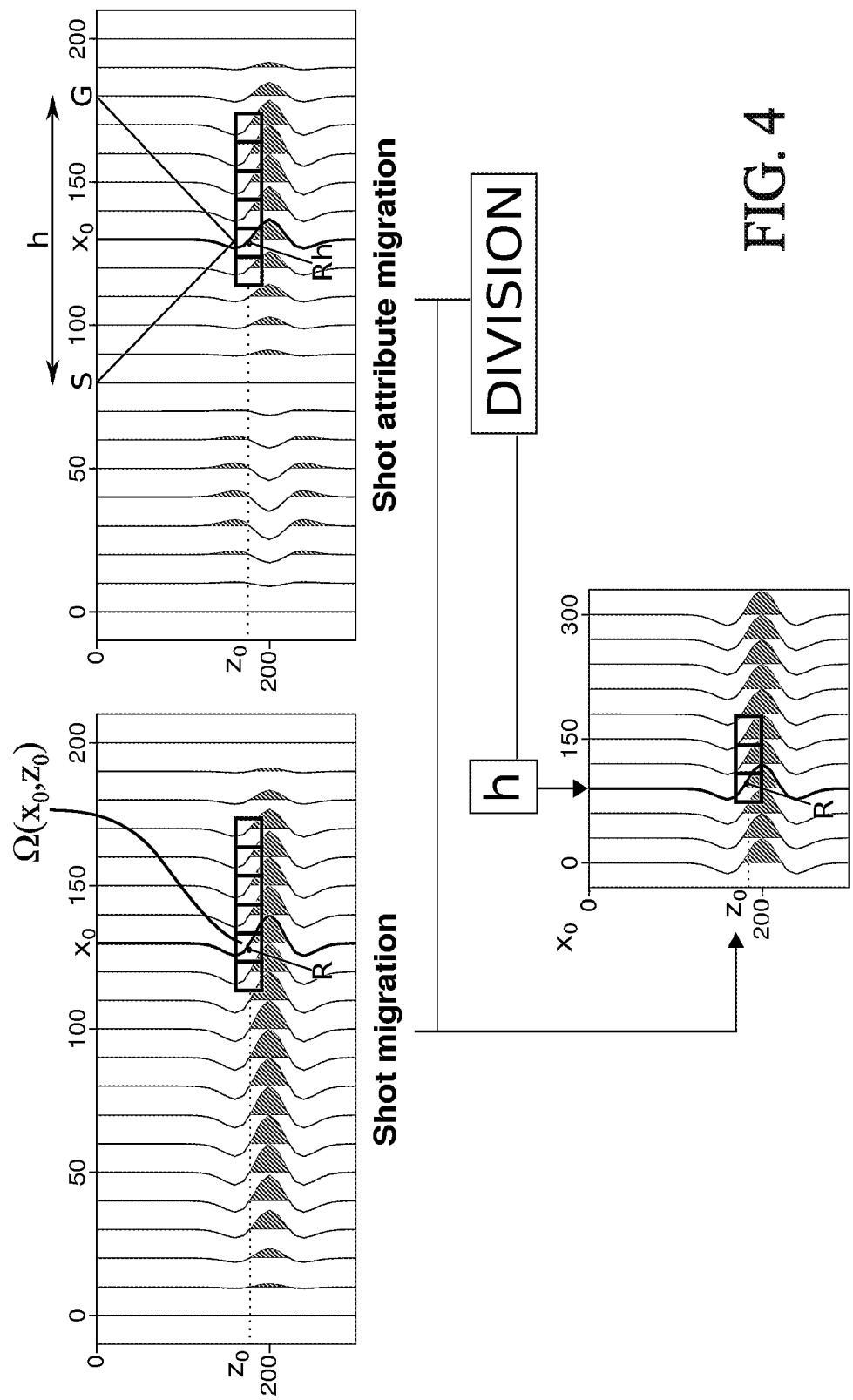
FIG. 4 is a diagram illustrating the derivation of surface offset CIGs in accordance with the method.

This process of computing the surface offset CIGs is illustrated in the diagram of FIG. 4. The offset attribute is obtained by the 'double migrated' map division. The two upper panels of the diagram depict two common shot migrated images showing a horizontal reflector. The first image is obtained by means of Reverse Time migration of plain seismic data, while the second is the output of migration where the data have been multiplied by the offset h. In this panel, amplitudes vary laterally along the reflector and are proportional to the receiver position and, therefore, to the offset. In particular, starting from the left side, the amplitude is negative, it reaches zero exactly below the source position and becomes positive afterwards.

For a specific position $(x_0, z_0)$ in the shot migrated image (here, the horizontal position $x_0$ may be 2D, with x and y components), we have a particular value of reflectivity R. At the same position in the attribute-migrated image, the value of the reflectivity is R multiplied by the offset h, which is the offset of the source/receiver couple that generated the specular reflection. The offset is simply the division of the two quantities. With these four values $(x_0, z_0, h, R)$, we can now build the migrated offset cube. The lower panel the diagram of FIG. 4 represents a common-midpoint section at the location $x_0$. The contribution of the reflectivity R is added to the position whose coordinates are given by the couple depth/offset $(z_0, h)$.

Figure 5A:
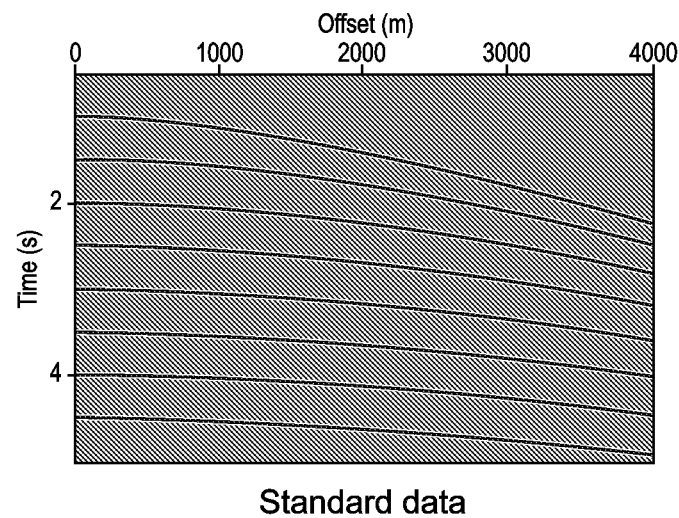
FIGS. 5A-5B show input data for the migration process in a simple example simulated by means of the proposed method.
Figure 5B:
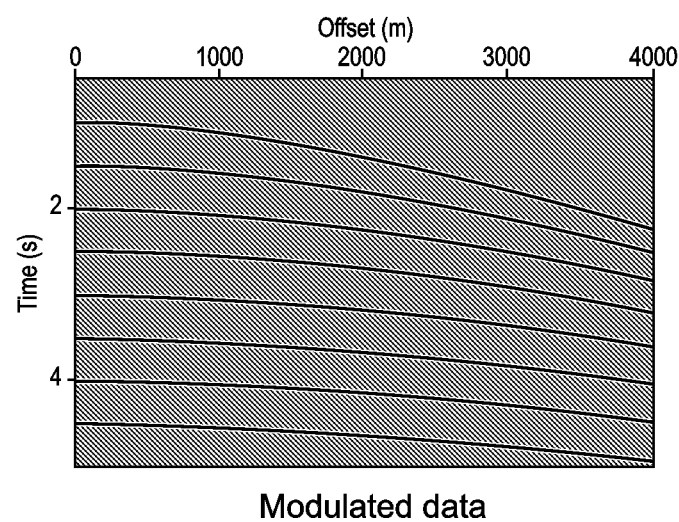

A numerical example can be presented to illustrate the above described method. In this example, the model is a 2D constant velocity 5 km in depth and 8 km in horizontal displacement rectangle. The velocity is assumed to be 2000 m/s and P-reflection data were generated by means of acoustic Born modeling introducing eight discontinuities every 500 m starting from 1 km. An amplitude-versus-offset (AVO) anomaly, where the reflection changes its polarity every 2000 m in offset, was simulated. Taking advantage of the de-facto 1D geometry, a full seismic survey can be represented by using only one source. That source is located at 3000 m, at a depth of 5 m below the surface. The receivers are located at the same depth, on the right side of the source every 25 m, starting from the source position. FIG. 5A shows the input common shot gather $D_{S,G}[t]$, while FIG. 5B shows the attribute-multiplied data $D'_{S,G}[t]$. Note how the amplitudes are emphasized by the modulation for larger offsets.

For more simplicity, a Frequency domain propagator was employed for migration in the simulation. A constant velocity model for the propagation, where the velocity is higher than the true velocity and equal to 2200 m/s, was taken. The obtained results are compared with the theoretical move-out which can be computed analytically for simple models. Additionally, correct detection of the AVO anomaly can be checked. For each data set and for each shot, two images are obtained.

Figure 6C:
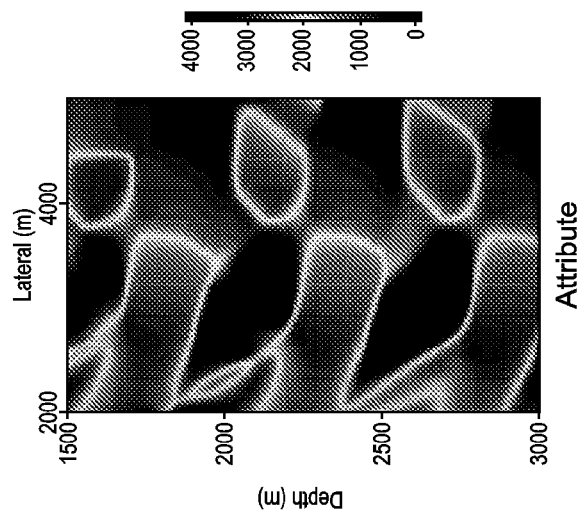
FIG. 6C shows the attribute estimation resulting from the division of the results.
Figure 6B:
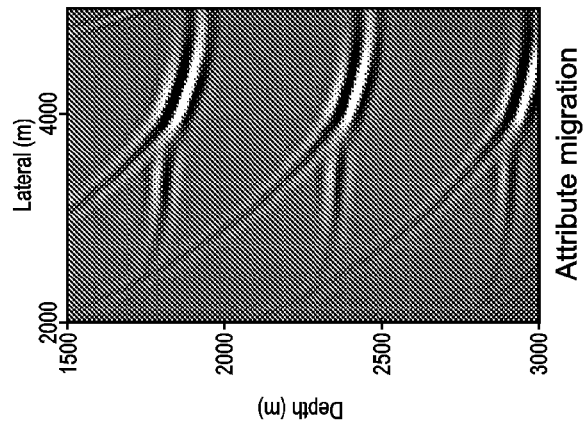
FIGS. 6A-6B show migration results in this example.
Figure 6A:
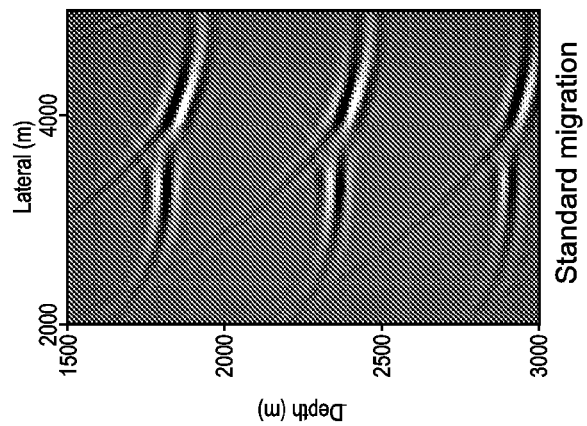

FIG. 6A-B shows the shot-migrated results for the data provided where the source is located at 3000 m. The plain migrated data $M_S[x,z]$ are displayed in FIG. 6A, while the attribute-migrated data $M'_S[x,z]$ are displayed in FIG. 6B. Unsurprisingly, amplitudes are emphasized by the modulation going from the left to the right of the acquisition. This behavior can be seen in FIG. 6B which represents the attribute obtained after division of the first two images. The estimation of the attribute occurs at the points on the reflectors for which there is a specular pair of rays from the source and the receiver to the surface point being imaged. At locations where this is not satisfied, i.e. where a non-zero reflectivity cannot be identified, the values of the attribute are not significant. By means of the obtained attribute map, the contribution of the reflectivity is then added at the corresponding offset position. To obtain the final offset migrated image, the contributions over all the shots are summed.

Figure 7:
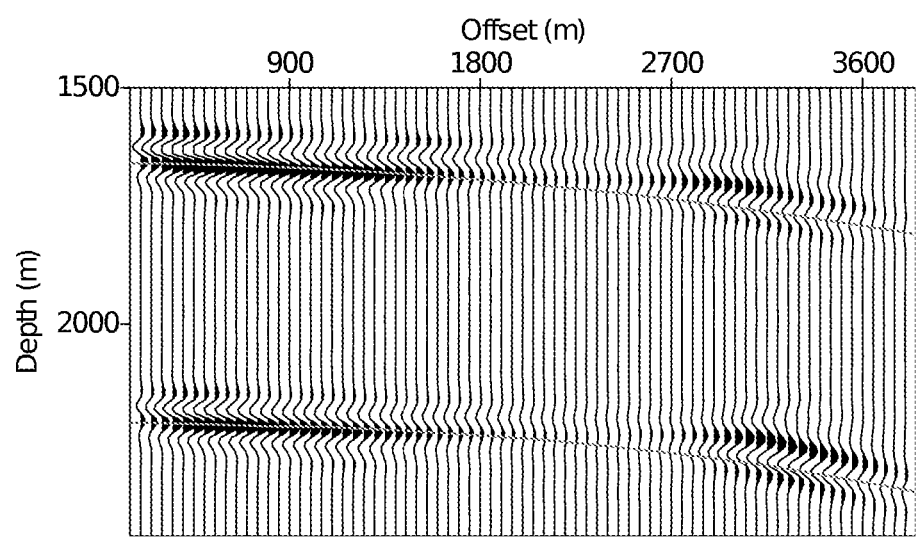
FIG. 7 is a diagram showing part of a surface offset CIG obtained by applying the method in the above-mentioned example.

FIG. 7 shows a zoom of the surface offset gather obtained from shot-geophone wave equation prestack depth migration with the same model parameters as in the previous section. In particular, it depicts two reflectors located at 1500 m and 2000 m in depth. Because of the error in the migration velocity, they are mispositioned and they exhibit a non-flat move-out. Also shown by solid lines in FIG. 7 are the theoretically predicted z(h) curves. As the figure demonstrates, the match is pretty good and the AVO anomaly is correctly detected.

The proposed method to obtain classical surface gathers for various PSDM techniques including Reverse Time migration showed to be successfully applicable in the context of band-limited propagation. The proposed methods do not depend on a particular implementation of wave-field extrapolation method, since it can be performed after shot-record migration in Fourier domain, time domain, etc.

An advantage of this method is that it allows the use of better propagators than rays to propagate the wave-field, making it possible to adopt the full arsenal of standard tools for post-processing developed for asymptotic migration schemes. Compared to Subsurface-Offset and Scattering Angle Subsurface-Offset, Surface Offset for RTM CIGs are way less expensive to compute, and they preserve the kinematic move-out.

The embodiments of the method described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

Typically, the method is carried out using software modules which may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

It will be appreciated that the embodiments described above are illustrative of the invention disclosed herein and that various modifications can be made without departing from the scope as defined in the appended claims.

The invention claimed is:

1. A method of seismic inspection of a subsoil region, comprising:
    firing a plurality of shots at respective source locations to propagate seismic waves in the subsoil region;
    recording seismic traces at a plurality of receiver locations in response to the plurality of shots to generate seismic data including, for each of the plurality of shots at the respective source locations, seismic traces recorded at the plurality of receiver locations;
    applying a depth migration process to the seismic data to obtain a first set of migrated data including, for each shot, first migrated values respectively associated with a plurality of subsurface positions;
    computing offset-modulated data by multiplying the seismic data in each seismic trace by a horizontal offset between the source and receiver locations for said seismic trace;
    applying the depth migration process to the offset-modulated data to obtain a second set of migrated data including, for each shot, second migrated values respectively associated with the plurality of subsurface positions;
    for each shot, estimating offset values respectively associated with at least some of the subsurface positions, by a division process applied to the first and second sets of migrated data; and
    estimating a common image gather at a horizontal position, comprising respective migrated values for parameter pairs each including a depth parameter and an offset parameter,
        wherein the migrated value for a parameter pair in the common image gather at said horizontal position is a first migrated value of the first set of migrated data associated with a subsurface position determined by said horizontal position and the depth parameter of said parameter pair for a shot such that the estimated offset value associated with said subsurface position is the offset parameter of said parameter pair.

2. The method as claimed in claim 1, wherein the division process used for estimating the offset values associated with a subsurface position comprises minimizing a cost function defined by an offset variable and local values of the first and second migrated values in a neighborhood of said subsurface position.

3. The method as claimed in claim 1, wherein the depth migration process is a reverse-time migration process.

4. The method as claimed in claim 1, wherein the depth migration process is a wave equation pre-stack depth migration process.

5. A system for inspecting a subsoil region, comprising:
at least one seismic source for firing a plurality of shots at respective source locations to propagate seismic waves in the subsoil region;
at least one receiver for recording seismic traces at a plurality of receiver locations in response to the plurality of shots to generate seismic data including, for each of the plurality of shots at the respective source locations, seismic traces recorded at the plurality of receiver locations; and
computer resources for processing the seismic data
wherein the computer resources are configured for:
applying a depth migration process to the seismic data to obtain a first set of migrated data including, for each shot, first migrated values respectively associated with a plurality of subsurface positions;
computing offset-modulated data by multiplying the seismic data in each seismic trace by a horizontal offset between the source and receiver locations for said seismic trace;
applying the depth migration process to the offset-modulated data to obtain a second set of migrated data including, for each shot, second migrated values respectively associated with the plurality of subsurface positions;
for each shot, estimating offset values respectively associated with at least some of the subsurface positions, by a division process applied to the first and second sets of migrated data; and
estimating a common image gather at a horizontal position, comprising respective migrated values for parameter pairs each including a depth parameter and an offset parameter,
wherein the migrated value for a parameter pair in the common image gather at said horizontal position is a first migrated value of the first set of migrated data associated with a subsurface position determined by said horizontal position and the depth parameter of said parameter pair for a shot such that the estimated offset value associated with said subsurface position is the offset parameter of said parameter pair.

6. The system as claimed in claim 5, wherein the division process used for estimating the offset values associated with a subsurface position comprises minimizing a cost function defined by an offset variable and local values of the first and second migrated values in a neighborhood of said subsurface position.

7. The system as claimed in claim 5, wherein the depth migration process is a reverse-time migration process.

8. The system as claimed in claim 5, wherein the depth migration process is a wave equation pre-stack depth migration process.

9. A non-transitory computer-readable medium having program instructions stored thereon for running in a system for inspecting a subsoil region, wherein said system comprises:
at least one seismic source for firing a plurality of shots at respective source locations to propagate seismic waves in the subsoil region;
at least one receiver for recording seismic traces at a plurality of receiver locations in response to the plurality of shots to generate seismic data including, for each of the plurality of shots at the respective source locations, seismic traces recorded at the plurality of receiver locations; and
a computer processing unit having an input for receiving the generated seismic data,
wherein the program instructions comprises instructions to carry out the following steps when run in said computer processing unit:
applying a depth migration process to the seismic data to obtain a first set of migrated data including, for each shot, first migrated values respectively associated with a plurality of subsurface positions;
computing offset-modulated data by multiplying the seismic data in each seismic trace by a horizontal offset between the source and receiver locations for said seismic trace;
applying the depth migration process to the offset-modulated data to obtain a second set of migrated data including, for each shot, second migrated values respectively associated with the plurality of subsurface positions;
for each shot, estimating offset values respectively associated with at least some of the subsurface positions, by a division process applied to the first and second sets of migrated data; and
estimating a common image gather at a horizontal position, comprising respective migrated values for parameter pairs each including a depth parameter and an offset parameter,
and wherein the migrated value for a parameter pair in the common image gather at said horizontal position is a first migrated value of the first set of migrated data associated with a subsurface position determined by said horizontal position and the depth parameter of said parameter pair for a shot such that the estimated offset value associated with said subsurface position is the offset parameter of said parameter pair.

10. The non-transitory computer-readable medium as claimed in claim 9, wherein the division process used for estimating the offset values associated with a subsurface position comprises minimizing a cost function defined by an offset variable and local values of the first and second migrated values in a neighborhood of said subsurface position.

11. The non-transitory computer-readable medium as claimed in claim 9, wherein the depth migration process is a reverse-time migration process.

12. The non-transitory computer-readable medium as claimed in claim 9, wherein the depth migration process is a wave equation pre-stack depth migration process.

* * * * *